US010503690B2

(12) United States Patent
Swarbrick (10) Patent No.: US 10,503,690 B2
(45) Date of Patent: Dec. 10, 2019

(54) PROGRAMMABLE NOC COMPATIBLE WITH MULTIPLE INTERFACE COMMUNICATION PROTOCOL

(71) Applicant: Xilinx, Inc., San Jose, CA (US)

(72) Inventor: Ian A. Swarbrick, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 9 days.

(21) Appl. No.: 15/904,211

(22) Filed: Feb. 23, 2018

(65) Prior Publication Data
US 2019/0266125 A1    Aug. 29, 2019

(51) Int. Cl.
| | |
|---|---|
| *G06F 15/78* | (2006.01) |
| *H04L 12/933* | (2013.01) |
| *H04L 29/06* | (2006.01) |
| *H04L 12/24* | (2006.01) |
| *H04L 12/805* | (2013.01) |

(52) U.S. Cl.
CPC ...... *G06F 15/7825* (2013.01); *G06F 15/7882* (2013.01); *H04L 41/0813* (2013.01); *H04L 49/109* (2013.01); *H04L 65/601* (2013.01); *H04L 47/36* (2013.01)

(58) Field of Classification Search
CPC ............................. H04L 29/06; H04L 12/6402
See application file for complete search history.

(56) References Cited

U.S. PATENT DOCUMENTS

| | | | |
|---|---|---|---|
| 6,418,147 B1 * | 7/2002 | Wiedeman | ......... H04B 7/18532 370/468 |
| 6,781,407 B2 | 8/2004 | Schultz | |
| 6,810,037 B1 | 10/2004 | Kalapathy et al. | |
| 7,185,309 B1 | 2/2007 | Kulkarni et al. | |
| 7,199,608 B1 | 4/2007 | Trimberger | |
| 7,281,093 B1 | 10/2007 | Kulkarni et al. | |
| 7,301,822 B1 | 11/2007 | Walstrum, Jr. et al. | |
| 7,454,658 B1 | 1/2008 | Baxter | |

(Continued)

OTHER PUBLICATIONS

U.S. Appl. No. 16/041,473, filed Jul. 20, 2018, Swarbrick, Ian A., et al., San Jose, CA USA.

(Continued)

*Primary Examiner* — Melanie Jagannathan
(74) *Attorney, Agent, or Firm* — Carleton Clauss (57) ABSTRACT

Embodiments herein describe a SoC that includes a programmable NoC that can be reconfigured to support different interface communication protocols. In one embodiment, the NoC includes ingress and egress logic blocks which permit hardware elements in the SoC (e.g., processors, memory, programmable logic blocks, etc.) to transmit and receive data using the NoC. The ingress and egress logic blocks may first be configured to support a particular communication protocol for interfacing with the hardware elements. However, at a later time, the user may wish to reconfigure the ingress and egress logic blocks to support a different communication protocol. In response, the SoC can reconfigure the NoC such that the ingress and egress logic blocks support the new communication protocol used by the hardware elements. In this manner, the programmable NoC can support multiple communication protocols used to interface with other hardware elements in the SoC.

20 Claims, 5 Drawing Sheets

(56) References Cited

U.S. PATENT DOCUMENTS

| | | | |
|---|---|---|---|
| 7,328,335 B1 | 2/2008 | Sundararajan et al. | |
| 7,380,035 B1 | 5/2008 | Donlin | |
| 7,420,392 B2 | 9/2008 | Schultz et al. | |
| 7,500,060 B1 | 3/2009 | Anderson et al. | |
| 7,521,961 B1 | 4/2009 | Anderson | |
| 7,574,680 B1 | 8/2009 | Kulkarni et al. | |
| 7,576,561 B1 | 8/2009 | Huang | |
| 7,650,248 B1 | 1/2010 | Baxter | |
| 7,653,820 B1 | 1/2010 | Trimberger | |
| 7,689,726 B1 | 3/2010 | Sundararajan et al. | |
| 7,788,625 B1 | 8/2010 | Donlin et al. | |
| 7,831,801 B1 | 11/2010 | Anderson | |
| 8,006,021 B1 | 8/2011 | Li et al. | |
| 8,020,163 B2 | 9/2011 | Nollet et al. | |
| 8,214,694 B1 | 7/2012 | McKechnie et al. | |
| 8,742,958 B2* | 6/2014 | Fallon | G06Q 40/04 341/50 |
| 9,152,794 B1 | 10/2015 | Sanders et al. | |
| 9,165,143 B1 | 10/2015 | Sanders et al. | |
| 9,230,112 B1 | 1/2016 | Peterson et al. | |
| 9,323,876 B1 | 4/2016 | Lysaght et al. | |
| 9,336,010 B2 | 5/2016 | Kochar | |
| 9,411,688 B1 | 8/2016 | Poolla et al. | |
| 9,652,252 B1 | 5/2017 | Kochar et al. | |
| 9,652,410 B1 | 5/2017 | Schelle et al. | |
| 10,243,882 B1 | 3/2019 | Swarbrick et al. | |
| 2002/0006137 A1* | 1/2002 | Rabenko | H04L 12/4604 370/466 |
| 2002/0093973 A1* | 7/2002 | Tzeng | H04L 12/5601 370/419 |
| 2003/0208566 A1 | 11/2003 | Weber et al. | |
| 2004/0052528 A1* | 3/2004 | Halgren | H04J 14/02 398/75 |
| 2004/0114609 A1 | 6/2004 | Swarbrick et al. | |
| 2004/0210695 A1 | 10/2004 | Weber et al. | |
| 2007/0067487 A1* | 3/2007 | Freebairn | H04L 12/6402 709/238 |
| 2008/0320255 A1 | 12/2008 | Wingard et al. | |
| 2008/0320268 A1 | 12/2008 | Wingard et al. | |
| 2011/0213887 A1* | 9/2011 | Hernanz | H04L 65/4069 709/227 |
| 2012/0036296 A1 | 2/2012 | Wingard et al. | |
| 2013/0034146 A1* | 2/2013 | Jeong | H04N 7/147 375/240.01 |
| 2015/0103822 A1 | 4/2015 | Gianchandani et al. | |
| 2015/0188847 A1 | 7/2015 | Chopra et al. | |
| 2015/0201041 A1* | 7/2015 | Wang | H04M 7/0072 709/203 |
| 2017/0031853 A1* | 2/2017 | Sadowski | G06F 13/362 |
| 2017/0140800 A1 | 5/2017 | Wingard et al. | |
| 2017/0295592 A1* | 10/2017 | Yang | H04W 72/0446 |
| 2018/0234993 A1* | 8/2018 | Hosseini | H04W 72/1226 |

OTHER PUBLICATIONS

U.S. Appl. No. 15/588,321, filed May 5, 2017, Camarota, R., et al., San Jose, CA USA.

ARM Limited, "AMBA 3 APB Protocol Specification," v1.0, Sep. 25, 2003, pp. 1-34, ARM Limited, Cambridge, United Kingdom.

ARM Limited, "AMBA 4 Axis-Stream Protocol Specification," v1.0, Mar. 3, 2010, pp. 1-42, ARM Limited, Cambridge, United Kingdom.

ARM Limited, "AMBA AXI and ACE Protocol Specification," Jun. 16, 2003, pp. 1-306, ARM Limited, Cambridge, United Kingdom.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersey, USA.

Glass, Christopher et al., "The Turn Model for Adaptive Routing," Journal of the Association for Computing Machinery, Sep. 1994, pp. 874-902, vol. 41, No. 5, ACM, New York, New York, USA.

Rantala, Ville et al., "Network on Chip Routing Algorithms," TUCS Techncal Report No. 779, Aug. 2006, pp. 1-38, Turku Centre for Computer Science, Turku, Finland.

U.S. Appl. No. 15/990,506, filed May 25, 2018, Swarbrick, Ian A., et al., San Jose, CA USA.

U.S. Appl. No. 15/964,901, filed Apr. 27, 2018, Swarbrick, Ian A., San Jose, CA USA.

Xilinx, Inc., "Zynq-7000 AP SoC—32 Bit DDR Access with ECC Tech Tip", 15 pages, printed on Aug. 10, 2018, http://www.wiki.xilinx.com/Zynq-7000+AP+SoC+-+32+Bit+DDR+Access+with+ECC+Tech+Tip, San Jose, CA USA U.S. Appl. No. 15/936,916, filed Jul. 20, 2018, Swarbrick, Ian A., et al., San Jose, CA USA.

U.S. Appl. No. 16/106,691, filed Aug. 21, 2018, Swarbrick, Ian A., et al., San Jose, CA USA.

U.S. Appl. No. 15/886,583, filed Feb. 1, 2018, Swarbrick, Ian A., et al., San Jose, CA USA.

* cited by examiner

PROGRAMMABLE NOC COMPATIBLE WITH MULTIPLE INTERFACE COMMUNICATION PROTOCOL

TECHNICAL FIELD

Examples of the present disclosure generally relate to a programmable network on a chip (NoC) and, in particular, to reconfiguring interface elements in the NoC to support different communication protocols.

BACKGROUND

A system on chip (SoC) (e.g., a field programmable gate array (FPGA), a programmable logic device (PLD), or an application specific integrated circuit (ASIC)) can contain a packet network structure known as a network on a chip (NoC) to route data packets between logic blocks in the SoC—e.g., programmable logic blocks, processors, memory, and the like. Although the NoC can be formed from programmable logic, this requires a lot of area on the SoC which could be used for other features or circuitry (e.g., more processors, memory, or available programmable logic for the user). Hardening all, or some, of the NoC (e.g., using non-programmable circuitry) can significantly reduce its footprint in the SoC but the NoC then loses flexibility. That is, the hardened components in the NoC cannot be reconfigured to support different communication protocols.

SUMMARY

Techniques for configuring a NoC in an integrated circuit are described. One example is a SoC that includes a NoC, a first hardware logic block, and a second hardware logic block. The NoC includes an ingress logic block connected to the first hardware logic block, an egress logic block connected to the second hardware logic block, and a plurality of interconnected switches connecting the ingress logic block to the egress logic block. Moreover, the ingress logic block includes a first encoder configured to convert received data compatible with a first interface communication protocol into a first packet and a second encoder configured to convert received data compatible with a second interface communication protocol into a second packet. Further, the egress logic block includes a first decoder configured to convert the first packet into data compatible with the first interface communication protocol and a second decoder configured to convert the second packet into data compatible with the second interface communication protocol.

One example described herein is a method that includes configuring a programmable NoC to provide communication between a first logic block and a second logic block in a SoC using a first communication protocol where a first encoder in an ingress logic block in the NoC is active and a first decoder in an egress logic block in the NoC is active. Upon determining to reconfigure the NoC to provide communication between the first and second logic blocks using a second communication protocol, the method includes activating a second encoder in the ingress logic block and deactivating the first encoder as well as activating a second decoder in the egress logic block and deactivating the first decoder.

One example described herein is an integrated circuit that includes a first hardware logic block, a second hardware logic block, and a NoC. The NOC includes an ingress logic block connected to the first hardware logic block. Moreover, the ingress logic block includes a first encoder and a second encoder where, when the NoC is operation, the ingress logic block is configured to activate one of the first and second encoders and deactivate the other encoder. The NoC also includes an egress logic block connected to the second hardware logic block. The egress logic block includes a first decoder and a second decoder, where, when the NoC is operation, the egress logic block is configured to activate one of the first and second decoders and deactivate the other decoder.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a SoC that includes a programmable NoC that can be reconfigured either at boot time or during operation to support different communication protocols. In one embodiment, the NoC includes interface elements (referred to herein as ingress and egress logic blocks) which permit hardware elements in the SoC (e.g., processors, memory, programmable logic blocks, and the like) to transmit and receive data using the NoC. When a SoC is first powered on, the ingress and egress logic blocks may be configured to support a particular communication protocol for interfacing with the hardware elements in the SoC. However, at a later time, the user may wish to reconfigure the ingress and egress logic blocks to support a different communication protocol. For example, when initially booting up the SoC, a programmable logic block may transmit and receive data using a memory mapped communication protocol but later is reprogrammed to transmit and receive data using a streaming communication protocol. In response, the SoC can reconfigure the NoC such that the ingress and egress logic blocks support the streaming communication protocol used by the programmable logic block. In this manner, the programmable NoC can be reconfigured (by rebooting the SoC or on the fly) to support multiple communication protocols.

In one embodiment, rather than using programmable logic to form the programmable NoC, some or all of the components forming the NoC are hardened—i.e., formed from non-programmable circuits. For example, the ingress and egress logic blocks may be formed from non-programmable circuits which can support multiple communication protocols. In one embodiment, the ingress logic blocks can include multiple encoders for supporting multiple communication protocols. For example, each ingress logic block can include a first encoder for supporting a memory mapped communication protocol and a second encoder for supporting a streaming communication protocol. Similarly, each egress logic block can include a first decoder for supporting the memory mapped communication protocol and a second decoder for supporting the streaming communication protocol. The NoC can also include a multi-protocol packet transfer network (which can also be formed from hardened circuitry) which uses a NoC packet protocol (NPP) to transfer packets between the ingress and egress logic blocks. Regardless whether the ingress and egress logic blocks use the first or second communication protocol, the transfer network can route the packets through the NoC to the appropriate destination in the SoC. Thus, the embodiments herein provide the flexibility of using a NoC implemented using programmable logic but with the area savings resulting from using hardened circuitry to form part, or all, of the NoC.

Figure 1:
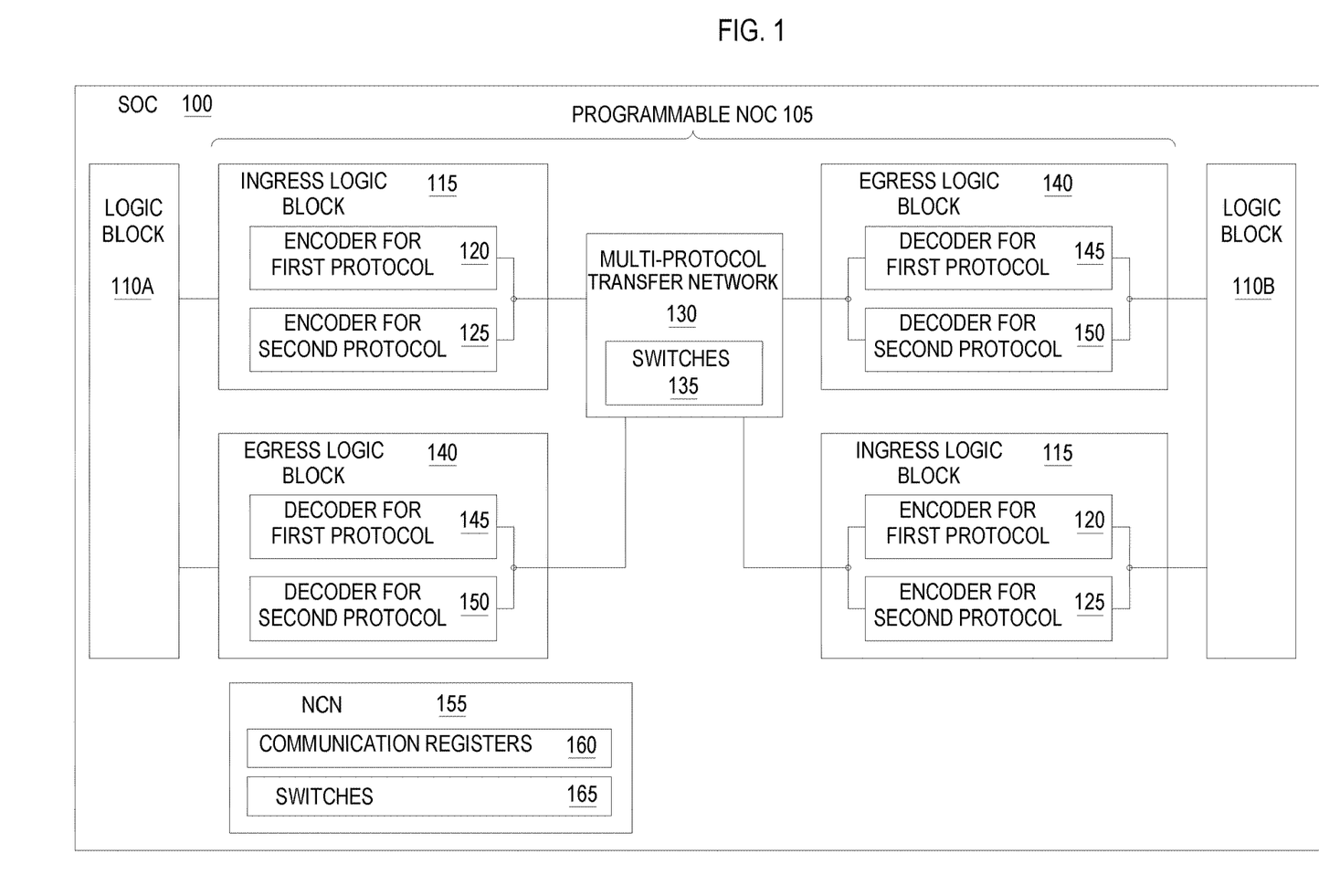
FIG. 1 is a block diagram of a SoC containing a programmable NoC, according to an example.

FIG. 1 is a block diagram of a SoC 100 containing a programmable NoC 105, according to an example. In addition to the NoC 105, the SoC 100 also includes logic blocks 110A and 110B which use the NoC 105 to transmit and receive data. Put differently, the logic blocks 110 rely on the NoC 105 to communicate. The logic blocks 110 can be any hardware element in the SoC 100 such as programmable logic blocks, processors, digital signal processing blocks, memory, and the like.

To enable communication between the logic blocks 110, the programmable NoC 105 includes ingress logic blocks 115 (also referred to as a NoC Master Unit (NMU)) and egress logic blocks 140 (also referred to as a NoC Slave Unit or NoC Servant Unit (NSU)) which are coupled to the logic blocks 110. The ingress and egress logic blocks 115, 140 serve as interfaces (and are referred to herein generally as "interface elements") between the NoC 105 and the logic blocks 110. An ingress logic block 115 receives data from the logic block 110, packetizes the data, and then forwards the packets to a multi-protocol transfer network 130. Using switches 135, the multi-protocol transfer network 130 routes the packets received from the ingress logic blocks 115 to one or more destination egress logic blocks 140. The egress logic blocks 140 depacketize the received packets and forward the decoded data to a logic block 110.

Each of the ingress logic blocks 115 includes an encoder for a first communication protocol 120 and an encoder for a second communication protocol 125. In one embodiment, the first and second communication protocols are used to transmit data from the logic blocks 110 to the ingress logic block 115. For example, the first protocol may be a memory mapped protocol while the second protocol is a streaming protocol. In one embodiment, the first protocol is the Advanced eXtensible Interface 4 (AXI4) while the second protocol is AXI4 streaming. However, the embodiments herein are not limited to any particular protocol and can be used to facilitate communication between the logic blocks 110 and the NoC 105 using protocols not specifically mentioned herein. Moreover, although FIG. 1 illustrates that the ingress logic block 115 include two encoders, the NoC 105 may support three, four, five, etc. different communication protocols, in which case the ingress logic blocks 115 can include a respective encoder for each communication protocol.

In one embodiment, the encoders 120 and 125 include different circuitry. For example, the AXI4 and AXI4 streaming communication protocols format data differently and use different techniques for transmitting data. As such, the encoders 120 and 125 include circuitry for encoding and packetizing data received from the respective protocols. In one embodiment, the encoders 120 and 125 are separate encoders with different functions. However, in some embodiments, the encoders 120 and 125 may have shared functionality, and thus, may share the same circuitry. For example, if the different protocols have one or more operations which are the same when packetizing data, the encoders 120 and 125 can share circuitry used to perform those common operations rather than each encoder 120 and 125 having duplicate circuitry.

In one embodiment, each ingress logic block 115 activates only one of the encoders 120 and 125. For example, when booting the SoC 100, based on control signals, the ingress logic block 115 activates one of the encoders and deactivates the other encoder in response to the type of communication protocol the logic block 110 uses to transmit data to the NoC 105. That is, if the logic block 110A uses a memory mapped protocol, the ingress logic block 115 may activate the encoder 120 (assuming it is configured to encode and packetize data received using the memory mapped protocol) and deactivate the encoder 125 which may encode and packetize streaming data.

Although all of the ingress logic blocks 115 in the NoC 105 can have the same type of encoder active (e.g., the encoder for the first protocol 120), in other example different ingress logic blocks 115 have different encoders active. For example, if the logic block 110A transmits data to the logic block 110B, then both logic blocks 110 may use the same communication protocol—e.g., a memory mapped communication protocol. However, two different logic blocks in the SoC may use the streaming communication protocol. In that case, the ingress logic blocks coupled to those logic blocks have a different encoder active than the ingress logic blocks 115 coupled to the logic blocks 110 shown in FIG. 1. Thus, the NoC 105 can facilitate the transfer of data that is received using different communication protocols in parallel. That is, one logic block 110 can transmit data to the NoC 105 using the memory mapped protocol at the same time another logic block transmits data to the NoC 105 using the streaming protocol.

The multi-protocol transfer network 130 permits the NoC 105 to route data that has been received from logic blocks using different communication protocol. In one embodiment, when packetizing the received data, the ingress logic blocks 115 convert the data into packets defined by the NoC packet protocol (NPP). Thus, regardless which communication protocol was used to send the data to the ingress logic block 115, the ingress logic block 115 converts the data to the NPP so the data can be transferred using the switches 135 in the transfer network 130. Put differently, the encoders 120 and 125 in the ingress switch convert the received data into the same network protocol—e.g., NPP—so that the data can traverse the NoC 105 regardless of the specific format used by the logic blocks 110 to transmit the data to the ingress logic blocks 115.

Once received, the egress logic blocks 140 depacketize or decode the packets and forward the decoded data using the communication protocol compatible with the downstream logic block 110. Like the ingress logic blocks 115, each of the egress logic blocks 140 includes a decoder for the first protocol 145 and a separate decoder for the second protocol 150. The decoders 145 and 150 can include separate circuitry or can share some circuitry if one or more of the decode operations are shared by both the first and second communication protocols. Moreover, although two decoders are shown, each egress logic block 140 can include three, four, or more different decoders depending on the number of communication protocols supported by the programmable NoC 105.

In one embodiment, the egress logic blocks 140 activates one of the decoders and deactivates the other decoder depending on the communication protocol used by the downstream logic block 110 coupled to the egress logic block 140. For example, the ingress and egress logic blocks 115 and 140 in FIG. 1 may be have encoder/decoders active that correspond to the communication protocol used by the logic blocks 110A and 1106. That is, assuming the logic block 110A transmits data to the logic block 1106 using the NoC 105, the ingress logic blocks 115 and egress logic blocks 140 activate the encoders and decoders corresponding to the same communication protocol.

The SoC 100 includes a NoC configuration network (NCN) 155 which includes configuration registers 160 and switches 165 for configuring the programmable NoC 105. In one embodiment, both the NoC 105 and the NCN 155 are complex packet protocol networks spread throughout the SoC 100. In one embodiment, the NCN 155 is a separate switching network from the NoC 105 which programs the NoC 105. That is, the NCN 155 can alter the manner in which the NoC 105 provides communication between endpoints in the SoC 100—e.g., the logic blocks 110. To do so, the NCN 155 includes the switches 165 that each includes multiple ports which can couple to the configuration registers 160 which store configuration information for configuring the ingress and egress logic blocks 115 and 140 as well as other components in the NoC 105 which are not discussed here. That is, the data stored in the configuration registers 160 instructs the ingress and egress logic blocks 115 and 140 which of the encoders 120 and 125 and decoders 145 and 150 to activate and which to deactivate which can be configured during boot and can be altered during operation of the SoC 100. Further, programming the ingress and egress logic blocks 115 and 140 using the NCN 155 means these blocks 115 and 140 can be programmed independently of programming any programmable logic (PL) fabric in the SoC (assuming that the SoC includes such a fabric for communicating with PL blocks).

Figure 2:
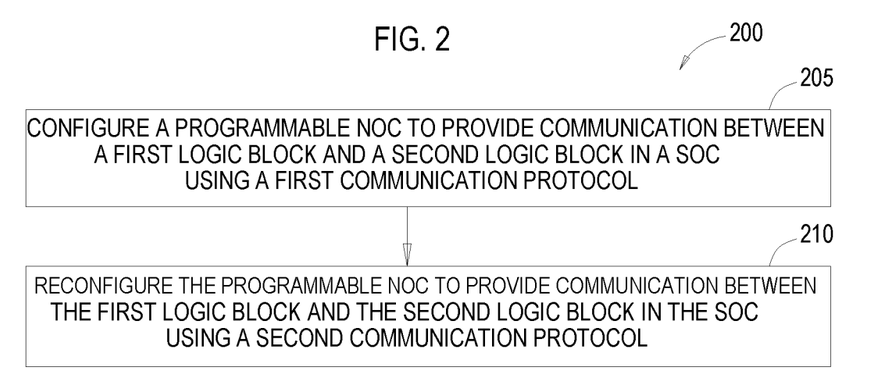
FIG. 2 is a flowchart for reconfiguring the programmable NoC, according to an example.

FIG. 2 is a flowchart of a method 200 for reconfiguring the programmable NoC, according to an example. At block 205, the NCN configures the programmable NoC to provide communication between a first logic block and a second logic block in a SoC using a first communication protocol. For example, the NCN 155 shown in FIG. 1 can configure the NoC 105 to enable communication between the logic blocks 110 when the logic blocks 110 use a first communication protocol (e.g., memory mapped or streaming communication protocol) to transmit data to, and receive data from, the NoC 105.

Sometime later, the user (or the logic block themselves) may want to switch to a different communication protocol to transfer data to and from the NoC. For example, the logic blocks may be programmable logic blocks that are reconfigured to use a different communication protocol. In another example, the logic blocks may be memory elements or a processor subsystem that can switch between two different communication protocols. For example, instead of using AXI4 to transmit data to the NoC, the first and second logic blocks now want to use AXI4 streaming to communicate with the NoC.

At block 210, the NCN reconfigures the programmable NoC to provide communication between the first logic block and the second logic block in the SoC using the second communication protocol. For example, the NCN may use switches to update the configuration registers associated with the programmable NoC which permit the NoC to receive and transmit data using the second communication protocol. In this manner, the programmable NoC can include hardened interface elements and still have the flexibility to switch between different communication protocols.

In one embodiment, the NCN reconfigures the programmable NoC after rebooting the SoC. That is, when rebooting, the NCN can update the configuration registers which programs the NoC to support the second communication protocol. However, in another embodiment, the NCN can reconfigure the programmable NoC without rebooting the SoC. In this example, the SoC may remain operational, although certain portions of the NoC may be unavailable when the reconfiguration occurs. For example, the portion of the NoC containing the ingress and egress logic blocks which have encoders and decoders that are activated/deactivated during the reconfiguration process may be unavailable for transmitting network traffic until the process is complete. In this manner, the NCN can reconfigure the NoC after rebooting the SoC or on the fly—i.e., while the SoC remains in an operational state.

Figure 3:
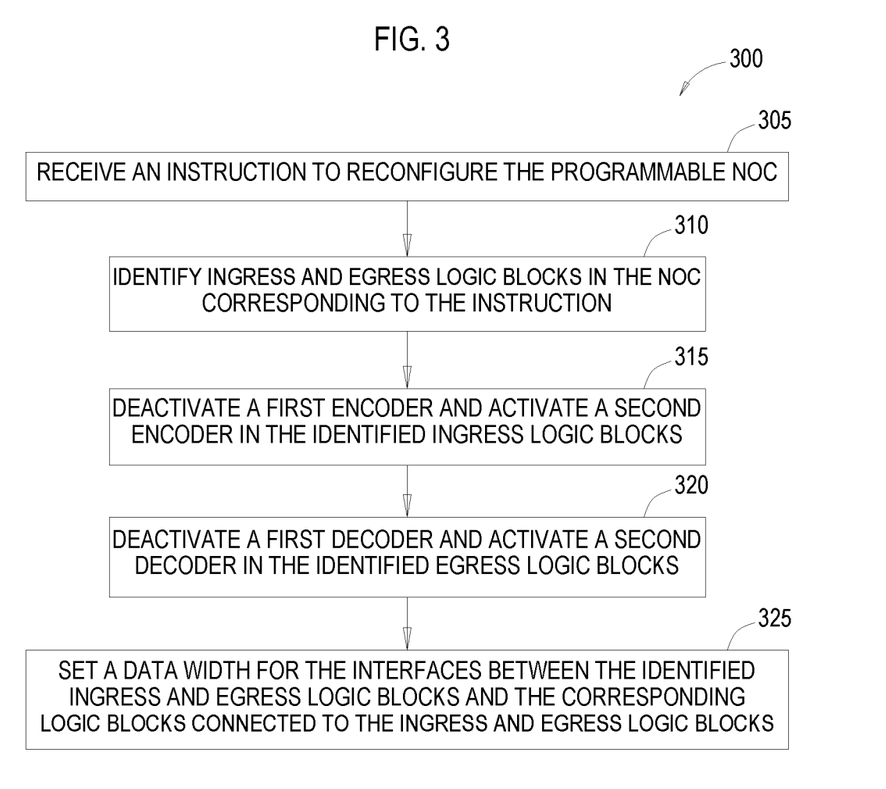
FIG. 3 is a flowchart for reconfiguring the programmable NoC, according to an example.

FIG. 3 is a flowchart of a method 300 for reconfiguring the programmable NoC, according to an example. In one embodiment, the method 300 describes in more detail block 210 of the method 200 where the programmable NoC is reconfigured to transmit and receive data using a different communication protocol.

The method 300 begins at block 305 where the NCN receives an instruction to reconfigure the programmable NoC. This instruction may be sent by a user who wants to change how the logic blocks communicate with the NoC or a by the logic blocks themselves after determining to switch to a different communication protocol for communicating with the NoC.

At block 310, the NCN identifies ingress and egress logic blocks in the NoC corresponding to the instruction. That is, the instruction may affect only a portion of the ingress and egress logic blocks rather than all these blocks in the NoC. For example, only two of the hardware logic blocks in the SoC may be changing how they communicate with the NoC while the remaining hardware logic blocks in the SoC are using the same communication protocol (or protocols) to communicate. As such, the NCN changes update only the ingress and egress logic blocks that are connected to the logic blocks that are changing their communication protocol while the remaining ingress and egress logic blocks are unchanged during method 300. For example, two programmable logic blocks in the SoC may switch to the second communication protocol while a processor subsystem, memory, and other programmable logic blocks coupled to the NoC use the same (i.e., the previous) communication protocol or protocols to communicate. As such, the NCN reconfigures the ingress and egress logic blocks connected to the two programmable logic blocks but leaves the other ingress and egress logic blocks unchanged.

In another embodiment, the NCN can reconfigure groups of ingress and egress logic blocks. For example, a first group may initially use the first interface communication protocol, while a second group uses the second interface communication protocol. Despite using different interface communication protocols, the first and second groups can transmit data in parallel through the NoC. Moreover, the first and second group can have respective data paths through the NoC that can share one or more switches. That is, the NoC can use the same switches (or different switches) for routing data between the ingress/egress logic blocks in the two groups. Later, the NCN can reconfigure the first group of ingress and egress logic blocks to use the second communication protocol while simultaneously reconfiguring the second group to use the first communication protocol. After being reconfigured, the first and second groups can again transmit data simultaneously in the NoC and use communication paths that may have switches in common.

At block 315, the NCN deactivates a first encoder and activates a second encoder in the identified ingress logic blocks. That is, the NCN switches the encoder used by the ingress logic block to the one compatible with the new communication protocol. To do so, in one embodiment, the NCN updates a configuration register corresponding to the ingress logic blocks which instructs the logic blocks to activate the appropriate encoder.

At block 320, the NCN deactivates a first decoder and activates a second decoder in the identified egress logic blocks. Put differently, the NCN activates the decoder that is compatible with the new communication protocol. In one embodiment, the NCN updates a configuration register corresponding to the egress logic blocks which instructs the logic blocks to activate the appropriate decoder.

At block 325, the NCN sets a data width for the interfaces between the identified ingress and egress logic blocks and the corresponding logic blocks connected to the ingress and egress logic blocks. That is, in addition to changing the communication protocol used by the NoC to communicate with the logic blocks, the NCN can also change the width of the data transferred between the NoC and the logic blocks. For example, the user can select a data width for the interface elements (i.e., the ingress and egress logic blocks) from 32-512 bits. In turn, the NCN instructs the ingress and egress logic blocks to receive or transmit data using the set data width.

Further, in one embodiment, the NCN can adjust or configure the frequency used by the ingress and egress logic blocks when receiving data from or transmitting data to the logic blocks. That is, the NCN can increase or reduce the speed at which the ingress and egress logic blocks transfer data with the logic blocks. In this manner, unlike a non-programmable NoC, the programmable NoC can change the interface communication protocol, data width, and frequency using the NCN and the ingress and egress logic blocks. Although the ingress and egress logic blocks can be formed from non-programmable circuitry (i.e., are hardened) to save area, in other embodiments, the ingress and egress logic blocks can include some programmable logic. That is, the embodiments herein may include some pro-grammable logic in the ingress and egress logic blocks (or other component in the NoC) for changing one or more operations performed by the ingress and egress logic blocks.

Figure 4:
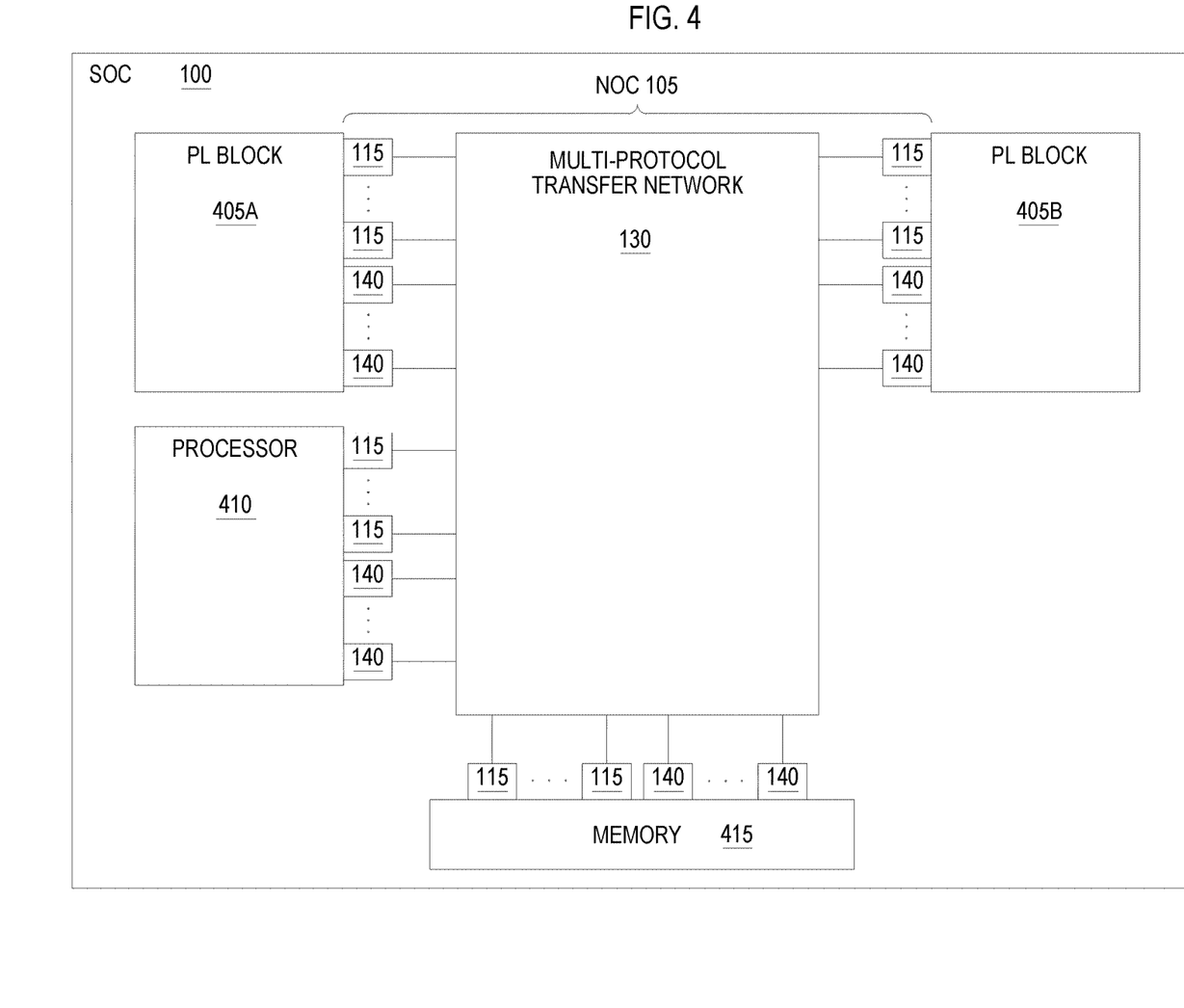
FIG. 4 is a block diagram of a SoC containing a programmable NoC, according to an example.

FIG. 4 is a block diagram of the SoC 100 containing a programmable NoC 105, according to an example. As shown, the NoC 105 interconnects a PL block 405A, a PL block 405B, a processor 410, and a memory 415. That is, the NoC 105 can be used in the SoC 100 to permit different hardened and programmable circuitry elements in the SoC 100 to communicate. For example, the PL block 405A may use one ingress logic block 115 to communicate with the PL block 405B and another ingress logic block 115 to communicate with the processor 410. However, in another embodiment, the PL block 405A may use the same ingress logic block 115 to communicate with both the PL block 405B and the processor 410 (assuming the endpoints use the same communication protocol). The PL block 405A can transmit the data to the respective egress logic blocks 140 for both the PL block 405B and the processor 410 which can determine if the data is intended for them based on an address (if using the memory mapped protocol) or a destination ID (if using the streaming protocol).

The PL block 405A may include egress logic blocks 140 for receiving data transmitted by the PL block 405B and the processor 410. In one embodiment, the hardware logic blocks are able to communicate with all the other hardware logic blocks also connected to the NoC 105, but in other embodiments, the hardware logic blocks may communicate with only a sub-portion of the other hardware logic blocks connected to the NoC 105. For example, the memory 415 may be able to communicate with the PL block 405A but not with the PL block 405B.

As described above, the ingress and egress logic blocks may all use the same communication protocol to communicate with the PL blocks 405, the processor 410, and the memory 415, or can use different communication protocols. For example, the PL block 405A may use a memory mapped protocol to communicate with the PL block 405B while the processor 410 uses a streaming protocol to communicate with the memory 415. Because the transfer network 130 can support multiple protocol (because the ingress logic blocks convert received data into the same NPP), the NoC 105 supports using different interface communication protocols in parallel. Put differently, the ingress logic blocks 115 convert the data received using different interface communication protocols into packets compatible with the same protocol (e.g., NPP) which are then routed by the switches in the transfer network 130 to the egress logic blocks 140. In turn, the egress logic blocks 140 convert the packets from the NPP into data compatible with the interface communication protocol used by the connected logic block.

In one embodiment, the SoC 100 is an FPGA which configures the PL blocks 405 according to a user design. That is, in this example, the FPGA includes both programmable and hardened logic blocks. However, in other embodiments, the SoC 100 may be an ASIC that includes only hardened logic blocks. That is, the SoC 100 may not include the PL blocks 405. Even though the logic blocks are non-programmable, the NoC 105 may still be programmable as described above so that the hardened logic blocks—e.g., the processor 410 and the memory 415 can switch between different communication protocols, change data widths at the interface, or adjust the frequency.

Figure 5:
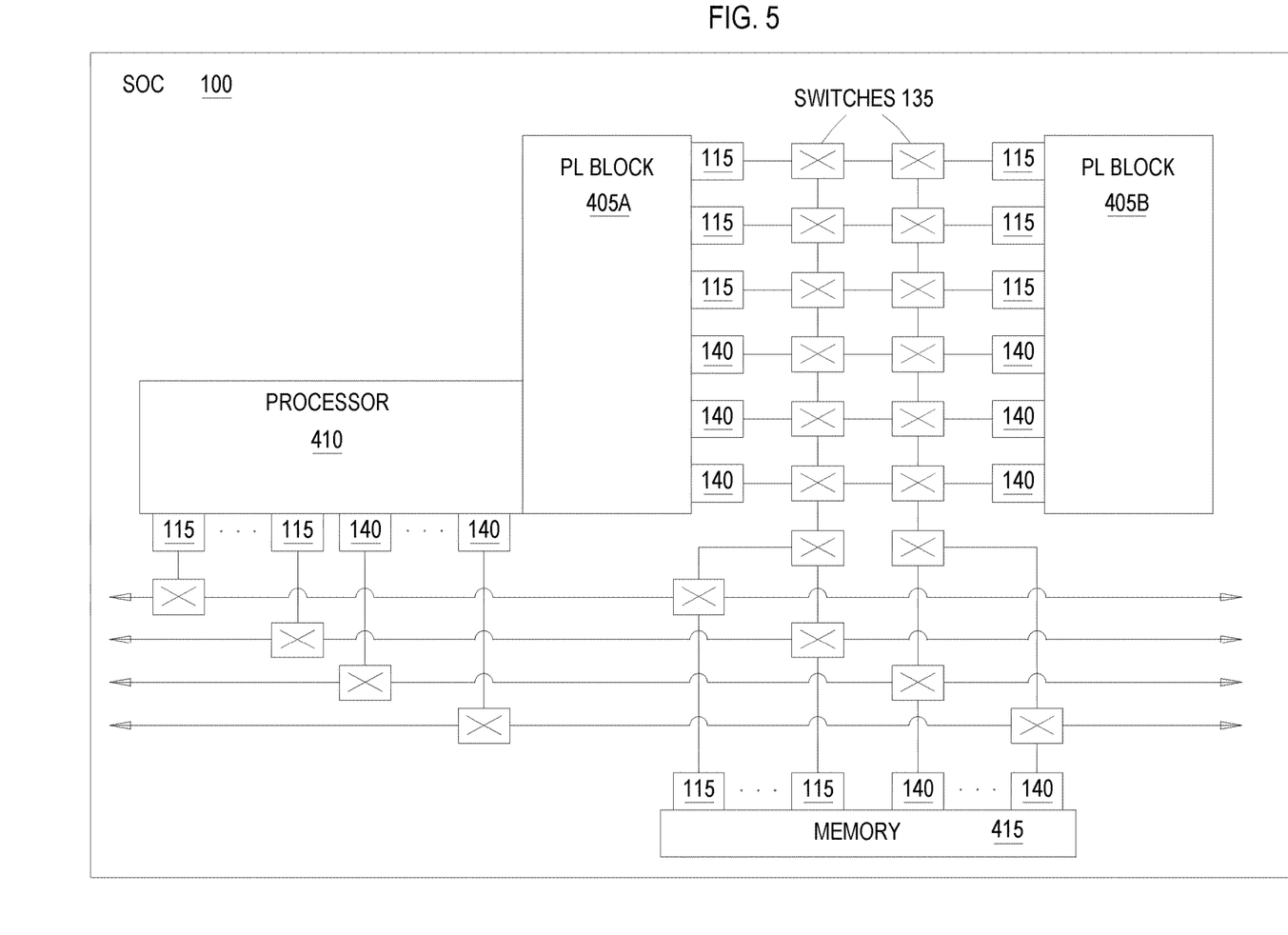
FIG. 5 illustrates an exemplary layout of a SoC containing a programmable NoC, according to an example.

FIG. 5 illustrates an exemplary layout of a SoC 100 containing a programmable NoC 105, according to an example. Like in FIG. 4, FIG. 5 illustrates the PL blocks 405, the processor 410, the memory 415, and the ingress and egress logic blocks 115 and 140. In addition, FIG. 5 illustrates the connections and various switches 135 (labeled as boxes with "X") used by the multi-protocol transfer network in the NoC to route packets between the ingress and egress logic blocks 115 and 140.

The locations of the PL blocks 405, the processor 410, and the memory 415 in the physical layout of the SoC 100 are just one example of arranging these hardware elements. Further, the SoC 100 can include more hardware elements than shown. For instance, the SoC 100 may include additional PL blocks, processors, and memory that are disposed at different locations on the SoC 100. Further, the SoC 100 can include other hardware elements such as I/O modules and a memory controller which may, or may not, be coupled to the NoC using respective ingress and egress logic blocks 115 and 140. For example, the I/O modules may be disposed around a periphery of the SoC 100.

In one embodiment, the NCN (which is not shown in FIG. 5) programs registers corresponding of the hardware logic blocks coupled to the NoC. That is, in addition to configuring the components in the NoC (e.g., the ingress and egress logic blocks 115 and 140), the NCN can configure the hardware logic blocks connected to the NoC using corresponding registers which enable these logic blocks to communicate with the NoC.

Figure 6:
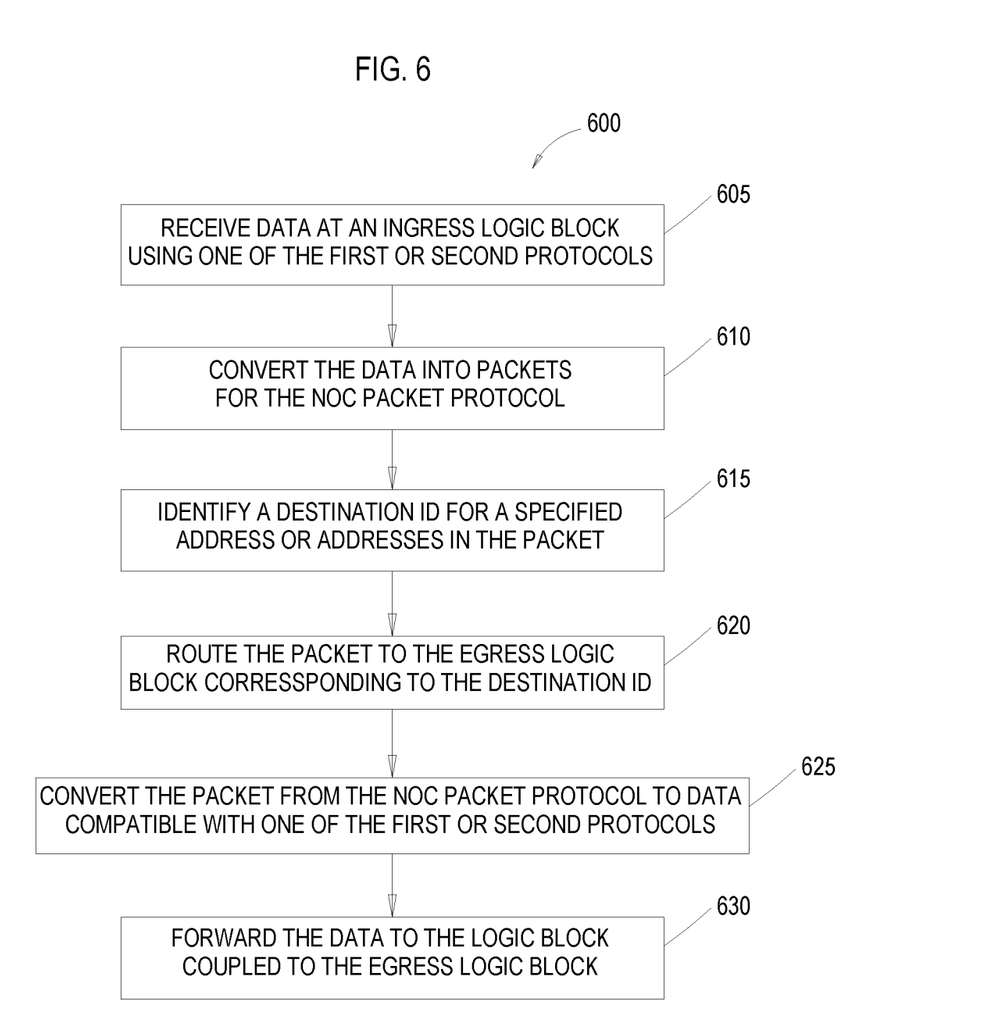
FIG. 6 is a flowchart for operating a programmable NoC, according to an example.

FIG. 6 is a flowchart of a method 600 for operating a programmable NoC, according to an example. At block 605, an ingress logic block receives data using one of the first or second protocols. That is, the NoC supports multiple different communication protocols which can be used to interface with other hardware logic blocks in the SoC. For example, the logic blocks may transmit data to, and receive data from, the NoC using AXI4 or AXI4 streaming at the ingress and egress logic blocks. Put differently, the NoC supports multiple interface communication protocols for transferring data to the NoC and receiving data from the NoC.

At block 610, the ingress logic block converts the received data into packets for the NPP. In one embodiment, the active encoder in the ingress logic block packetizes the received data into packets compatible with NPP. As such, the received data is modified to form the packets that are then routed through the NoC.

In addition to having an active encoder, the ingress logic block can include an inactive encoder (or multiple inactive encoders) which corresponds to another interface communication protocol (or protocols) that is supported by the NoC but is not currently being used by the connected logic block to transfer data to the ingress logic block. In one embodiment, only one encoder in the ingress logic block is active when the NoC is operational.

At block 615, the ingress logic block identifies a destination ID for a specified address or addresses in the packet. The destination ID for the packet governs how the packet is routed through the transfer network (e.g., the interconnected switches) in the NoC. Put differently, the switches used to route the packet in the NoC are selected based on the destination ID.

At block 620, the multi-protocol transfer network routes the packet to the egress logic block corresponding to the destination ID. For example, using the interconnects and switches 135 shown in FIG. 5, the NoC can route a packet received from an ingress logic block 115 to a desired egress logic block 140.

At block 625, the egress logic block converts the packet from the NPP to data compatible with one of the first or second protocols. In one embodiment, the egress logic block uses a decoder to depacketize the received packets and convert the data into a format compatible with the first or second protocol. In one embodiment, the egress logic block converts the data into the same protocol that was used by the ingress logic block at block 605 to receive the data from a connected logic block.

At block 630, the egress logic block forwards the converted data to the logic block coupled to the egress logic block. In this manner, the ingress and egress logic blocks can facilitate communication between logic blocks connected to the NoC. The method 600 can be used regardless whether the ingress and egress logic blocks are configured to support the first protocol or the second protocol. That is, the NCN may change the ingress and egress logic blocks to transmit (or change the data width or the frequency) but the method 600 would remain substantially unchanged.

While the foregoing is directed to specific examples, other and further examples may be devised without departing from the basic scope thereof, and the scope thereof is determined by the claims that follow.

What is claimed is:

1. A system on a chip (SoC), comprising:
a first hardware logic block;
a second hardware logic block; and
a network on a chip (NoC), wherein the first and second hardware logic blocks and the NoC are disposed on a same semiconductor chip, the NoC comprising:
an ingress logic block connected to the first hardware logic block,
an egress logic block connected to the second hardware logic block, and
a plurality of interconnected switches connecting the ingress logic block to the egress logic block,
wherein the ingress logic block comprises a first encoder configured to convert received data compatible with a first interface communication protocol into a first packet and a second encoder configured to convert received data compatible with a second interface communication protocol into a second packet,
wherein the egress logic block comprises a first decoder configured to convert the first packet into data compatible with the first interface communication protocol and a second decoder configured to convert the second packet into data compatible with the second interface communication protocol.

2. The SoC of claim 1, wherein the ingress logic block is configured to activate one of the first and second encoders and deactivate the other encoder when the NoC is operational, and the egress logic block is configured to activate one of the first and second decoders and deactivate the other decoder when the NoC is operational.

3. The SoC of claim 2, wherein, when the first encoder is active in the ingress logic block, the first decoder is active in the egress logic block and the second decoder is inactive, and when the second encoder is active in the ingress logic block, the second decoder is active in the egress logic block and the first decoder is inactive.

4. The SoC of claim 1, wherein the first and second encoders in the ingress logic block and the first and second decoders in the egress logic block comprise hardened circuitry.

5. The SoC of claim 1, wherein the ingress logic block is configured to adjust (i) a data width at an interface used to transfer data from the first hardware logic block to the ingress logic block and (ii) a frequency with which data is transmitted through the interface.

6. The SoC of claim 1, wherein the first and second packets are both compatible with a NoC packet protocol used to route the first and second packets through the plurality of switches.

7. The SoC of claim 1, wherein the first interface communication protocol is a memory mapped communication protocol and the second interface communication protocol is a streaming protocol.

8. The SoC of claim 1, wherein the first and second hardware logic blocks are programmable logic blocks that can be reconfigured by a user, wherein the first and second encoders and the first and second decoders can be activated and deactivated independently of a programmable logic fabric associated with the programmable logic blocks.

9. The SoC of claim 8, wherein the SoC comprise a field programmable gate array (FPGA).

10. The SoC of claim 1, wherein the first and second hardware logic blocks are hardened logic blocks that are non-programmable.

11. A method, comprising: configuring a network on a chip (NoC) to provide communication between a first logic block and a second logic block in a SoC using a first interface communication protocol, wherein a first encoder in an ingress logic block in the NoC is active and a first decoder in an egress logic block in the NoC is active; and upon determining to reconfigure the NoC to provide communication between the first and second logic blocks using a second interface communication protocol: activating a second encoder in the ingress logic block and deactivating the first encoder by updating a first configuration register corresponding to the ingress logic block, and activating a second decoder in the egress logic block and deactivating the first decoder by updating a second configuration register corresponding to the egress logic block.

12. The method of claim 11, further comprising:
receiving first data at the ingress logic block from the first logic block, wherein the first data is compatible with the first interface communication protocol;
converting the first data into a first packet using the first encoder;
routing the first packet to the egress logic block using a plurality of switches in the NoC;
converting the first packet into second data compatible with the first interface communication protocol using the first decoder; and
forwarding the second data to the second logic block.

13. The method of claim 12, further comprising, after reconfiguring the NoC:
receiving third data at the ingress logic block from the first logic block, wherein the first data is compatible with the second interface communication protocol;
converting the third data into a second packet using the second encoder;
routing the second packet to the egress logic block using the plurality of switches;
converting the second packet into fourth data compatible with the second interface communication protocol using the second decoder; and
forwarding the fourth data to the second logic block.

14. The method of claim 11, further comprising:
configuring the NoC to provide communication between a third logic block and a fourth logic block in the SoC using the second interface communication protocol;
transmitting data between the third and fourth logic blocks using the second interface communication protocol in parallel with transmitting data between the first and second logic blocks using the first interface communication protocol;
reconfiguring the NoC to provide communication between the third and fourth logic blocks using the first interface communication protocol; and
transmitting data between the third and fourth logic blocks using the first interface communication protocol in parallel with transmitting data between the first and second logic blocks using the second interface communication protocol, wherein the third and fourth logic blocks and the first and second logic blocks have respective communication paths through the NoC that share at least one switch in the NoC.

15. The method of claim 11, further comprising:
adjusting a data width of an interface used to transfer data from the first logic block to the ingress logic block; and
adjusting a frequency with which data is transmitted through the interface.

16. The method of claim 11, wherein the first and second packets are both compatible with a NoC packet protocol used to route the first and second packets through the plurality of switches.

17. The method of claim 11, wherein the first interface communication protocol is a memory mapped communication protocol and the second interface communication protocol is a streaming protocol.

18. The method of claim 11, further comprising:
reprogramming programmable logic in the first and second logic blocks, wherein the first and second logic blocks and the NoC are contained within an FPGA.

19. An integrated circuit, comprising: a first hardware logic block; a second hardware logic block; and a network on a chip (NoC), the NoC comprising: an ingress logic block connected to the first hardware logic block, wherein the ingress logic block comprises a first encoder and a second encoder, wherein, when the NoC is operation, the ingress logic block is configured to activate one of the first and second encoders and deactivate the other encoder in response to an update in a first configuration register corresponding to the ingress logic block, and an egress logic block connected to the second hardware logic block, wherein the egress logic block comprises a first decoder and a second decoder, wherein, when the NoC is operation, the egress logic block is configured to activate one of the first and second decoders and deactivate the other decoder in response to an update in a second configuration register corresponding to the egress logic block.

20. The integrated circuit of claim 19, wherein the first encoder is configured to convert received data compatible with a first interface communication protocol into a first packet and the second encoder is configured to convert received data compatible with a second interface communication protocol into a second packet,
wherein the first decoder is configured to convert the first packet into data compatible with the first interface communication protocol and the second decoder is configured to convert the second packet into data compatible with the second interface communication protocol.

* * * * *